(12) United States Patent
Mossoba et al.

(10) Patent No.: US 12,494,191 B2
(45) Date of Patent: Dec. 9, 2025

(54) FLEXIBLE TEXT-TO-SPEECH FOR SCREEN READERS

(71) Applicant: Capital One Services, LLC, McLean, VA (US)

(72) Inventors: Michael Mossoba, Great Falls, VA (US); Abdelkader M'Hamed Benkreira, Brooklyn, NY (US); Joshua Edwards, Philadelphia, PA (US); Noel Lyles, Alexandria, VA (US)

(73) Assignee: Capital One Services, LLC, McLean, VA (US)

( * ) Notice: Subject to any disclaimer, the term of this patent is extended or adjusted under 35 U.S.C. 154(b) by 557 days.

(21) Appl. No.: 17/706,065

(22) Filed: Mar. 28, 2022

(65) Prior Publication Data
US 2023/0306956 A1 Sep. 28, 2023

(51) Int. Cl.
| G10L 13/08 | (2013.01) |
| G10L 13/04 | (2013.01) |
| G10L 15/18 | (2013.01) |
| G10L 15/22 | (2006.01) |

(52) U.S. Cl.
CPC .............. *G10L 13/08* (2013.01); *G10L 13/04* (2013.01); *G10L 15/18* (2013.01); *G10L 15/22* (2013.01); *G10L 2015/223* (2013.01)

(58) Field of Classification Search
CPC ......... G10L 13/08; G10L 13/04; G10L 15/18; G10L 15/22; G10L 2015/223; G10L 13/027
See application file for complete search history.

(56) References Cited

U.S. PATENT DOCUMENTS

| 7,558,769 | B2 | 7/2009 | Scott et al. | |
| 9,117,445 | B2* | 8/2015 | Conkie | G06F 3/167 |
| 9,536,437 | B1* | 1/2017 | Chen | G06F 40/134 |
| 9,990,176 | B1* | 6/2018 | Gray | G06F 16/957 |
| 10,853,580 | B1* | 12/2020 | Amrite | G06N 3/08 |
| 2001/0014860 | A1* | 8/2001 | Kivimaki | G10L 13/04 |
| | | | | 704/235 |

(Continued)

FOREIGN PATENT DOCUMENTS

WO 2006042292 A2 4/2006

OTHER PUBLICATIONS

Li Chen, et al., "Preference-based clustering reviews for augmenting e-commerce recommendation" (2013), Knowledge-Based Systems, vol. 50, Elsevier B.V., pp. 44-59.

*Primary Examiner* — Athar N Pasha
(74) *Attorney, Agent, or Firm* — Harrity & Harrity, LLP

(57) ABSTRACT

In some implementations, a user device may receive a set of words, for conversion to speech, including a plurality of subsets of the set of words, where each subset of the plurality of subsets is associated with one or more corresponding formatting properties. The user device may identify, within the set of words, a first subset of the plurality of subsets as relevant based on the one or more corresponding formatting properties associated with the first subset. Additionally, the user device may identify, within the set of words, a second subset of the plurality of subsets as not relevant based on the one or more corresponding formatting properties associated with the second subset. Accordingly, the user device may input the first subset to a text-to-speech algorithm.

20 Claims, 9 Drawing Sheets

(56) References Cited

U.S. PATENT DOCUMENTS

| | | | |
|---|---|---|---|
| 2009/0169061 A1* | 7/2009 | Anderson | G06V 30/414 |
| | | | 382/114 |
| 2013/0144862 A1 | 6/2013 | Ruhl et al. | |
| 2014/0013211 A1* | 1/2014 | Sakata | G06F 40/143 |
| | | | 715/235 |
| 2014/0046925 A1* | 2/2014 | Strohm | G06F 16/951 |
| | | | 707/E17.108 |
| 2019/0035403 A1* | 1/2019 | Ramasamy | G06F 3/167 |
| 2019/0196675 A1* | 6/2019 | German | G06V 30/40 |
| 2019/0204998 A1* | 7/2019 | Hartrell | G10L 15/26 |
| 2019/0394238 A1* | 12/2019 | Putz | G06N 3/08 |
| 2020/0301679 A1* | 9/2020 | Eteminan | G06F 11/3688 |
| 2021/0056950 A1* | 2/2021 | Niehaus | G10L 13/00 |
| 2021/0134265 A1* | 5/2021 | Rafferty | G06F 40/279 |
| 2022/0058347 A1* | 2/2022 | Singaraju | G06F 40/40 |
| 2022/0291792 A1* | 9/2022 | Alston | G06F 3/167 |

* cited by examiner

FLEXIBLE TEXT-TO-SPEECH FOR SCREEN READERS

BACKGROUND

Users with visual impairments often use screen readers to generate audio based on content displayed on a screen. For example, a visually impaired user may navigate to a webpage, using a user device, and use a text-to-speech algorithm to generate audio based on content of the webpage.

SUMMARY

Some implementations described herein relate to a system for flexible text-to-speech for screen readers. The system may include one or more memories and one or more processors communicatively coupled to the one or more memories. The one or more processors may be configured to receive a setting indicating at least one part of speech. The one or more processors may be further configured to receive a set of words for conversion to speech. The one or more processors may be configured to identify, within the set of words, a first subset of the set of words that correspond to the at least one part of speech. The one or more processors may be further configured to identify, within the set of words, a second subset of the set of words associated with a font size that fails to satisfy a size threshold. The one or more processors may be configured to skip the first subset and the second subset while inputting remaining words of the set of words to a text-to-speech algorithm.

Some implementations described herein relate to a method of flexible text-to-speech for screen readers. The method may include receiving a set of words, for conversion to speech, including a plurality of subsets of the set of words, where each subset of the plurality of subsets is associated with one or more corresponding formatting properties. The method may further include identifying, within the set of words, a first subset of the plurality of subsets as relevant based on the one or more corresponding formatting properties associated with the first subset. The method may include identifying, within the set of words, a second subset of the plurality of subsets as not relevant based on the one or more corresponding formatting properties associated with the second subset. The method may further include inputting the first subset to a text-to-speech algorithm.

Some implementations described herein relate to a non-transitory computer-readable medium that stores a set of instructions for flexible text-to-speech for screen readers for a device. The set of instructions, when executed by one or more processors of the device, may cause the device to receive a first input associated with a skim mode. The set of instructions, when executed by one or more processors of the device, may further cause the device to receive a set of words for conversion to speech. The set of instructions, when executed by one or more processors of the device, may cause the device to identify, within the set of words, a first subset of the set of words as relevant based on a machine learning model. The set of instructions, when executed by one or more processors of the device, may further cause the device to identify, within the set of words, a second subset of the set of words as not relevant based on a machine learning model. The set of instructions, when executed by one or more processors of the device, may cause the device to input the first subset to a text-to-speech algorithm based on the first input. The set of instructions, when executed by one or more processors of the device, may further cause the device to receive a second input associated with a full read mode. The set of instructions, when executed by one or more processors of the device, may cause the device to stop inputting remaining words of the first subset and input remaining words of the second subset based on the second input.

DETAILED DESCRIPTION

The following detailed description of example implementations refers to the accompanying drawings. The same reference numbers in different drawings may identify the same or similar elements.

Many applications and operating systems provide screen readers that generate audio based on content displayed on a screen. For example, a visually impaired user may use a browser application to navigate to a webpage and use a screen reader (that includes a text-to-speech algorithm) to generate audio based on content of the webpage. However, screen readers can consume significant amounts of processing resources and power when the content includes a significant quantity of words. For example, the content may directly include words and/or may include alternative text (e.g., associated with images and/or other multimedia content) that is activated when the screen reader is used.

Some implementations described herein provide for conserving processing resources and power by reducing a quantity of words to be converted to audio by a text-to-speech algorithm (e.g., included in a screen reader). In some implementations, a user may provide a setting, indicating at least one part of speech, in order to reduce the quantity of words. Additionally, or alternatively, a relevance model may determine less relevant words to exclude in order to reduce the quantity of words. As a result, a user device consumes less power and processing resources when providing text-to-speech for the user.

Figure 1A:
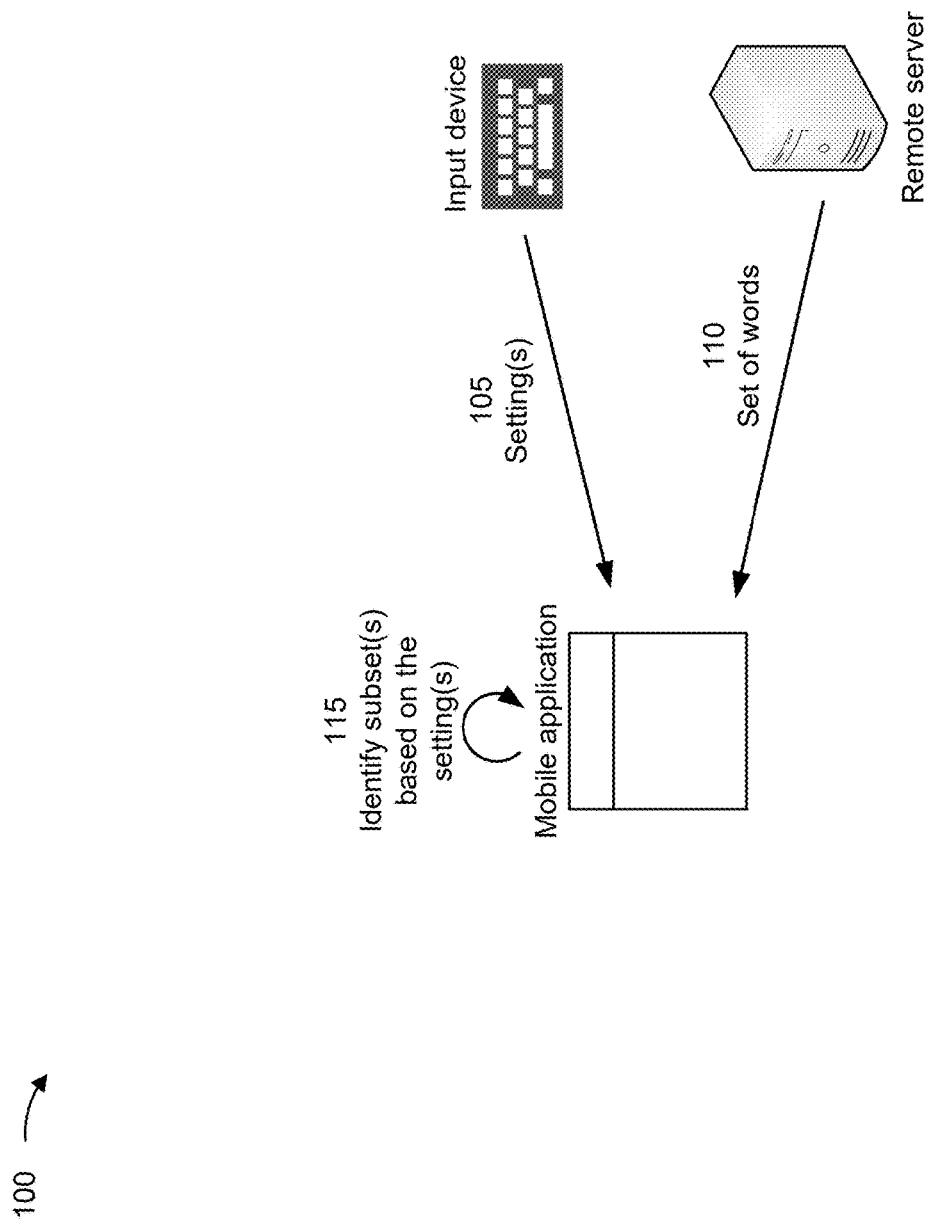
FIGS. 1A-1C are diagrams of an example implementation relating to flexible text-to-speech for screen readers.
Figure 1B:
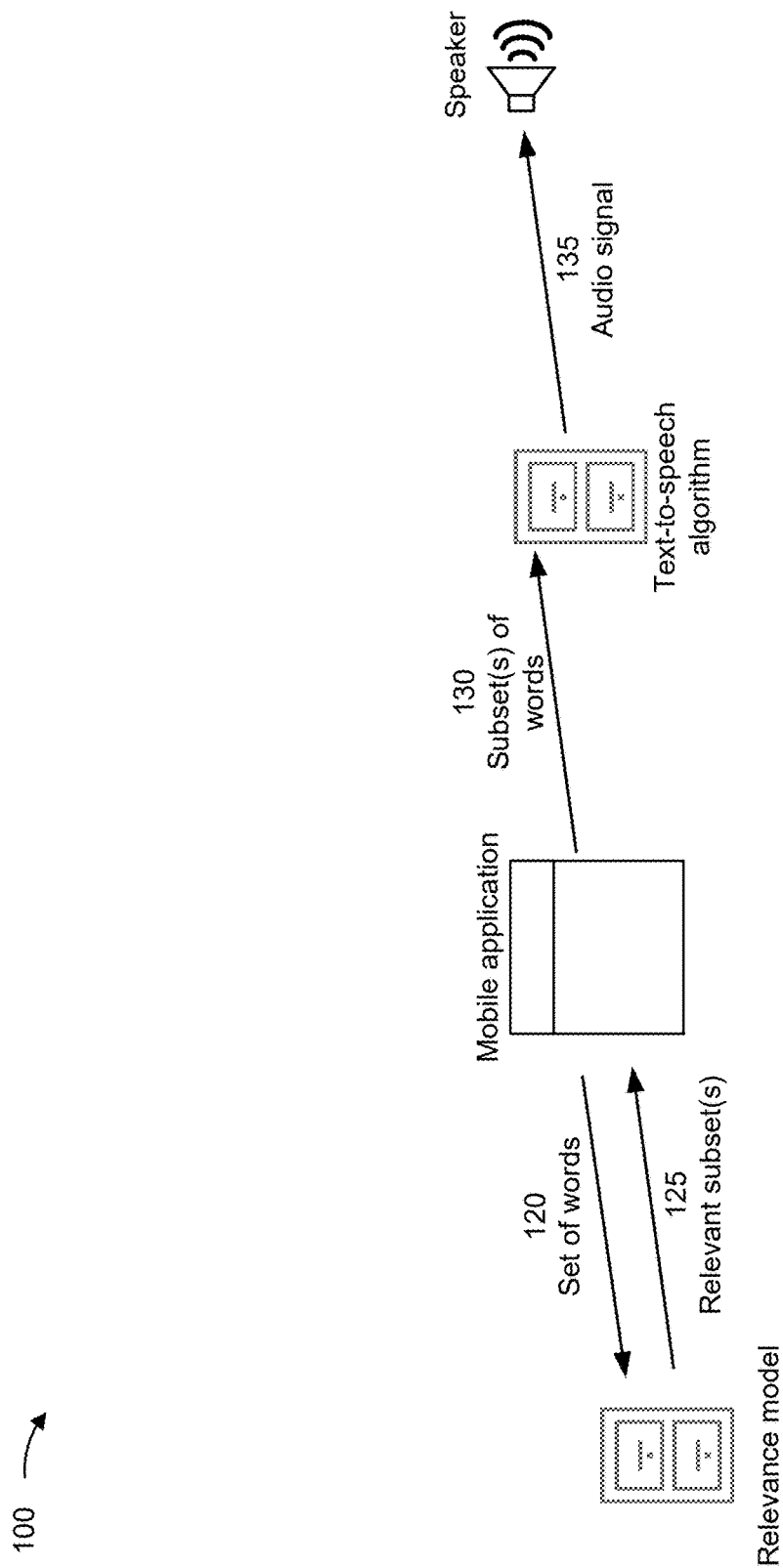
Figure 1C:
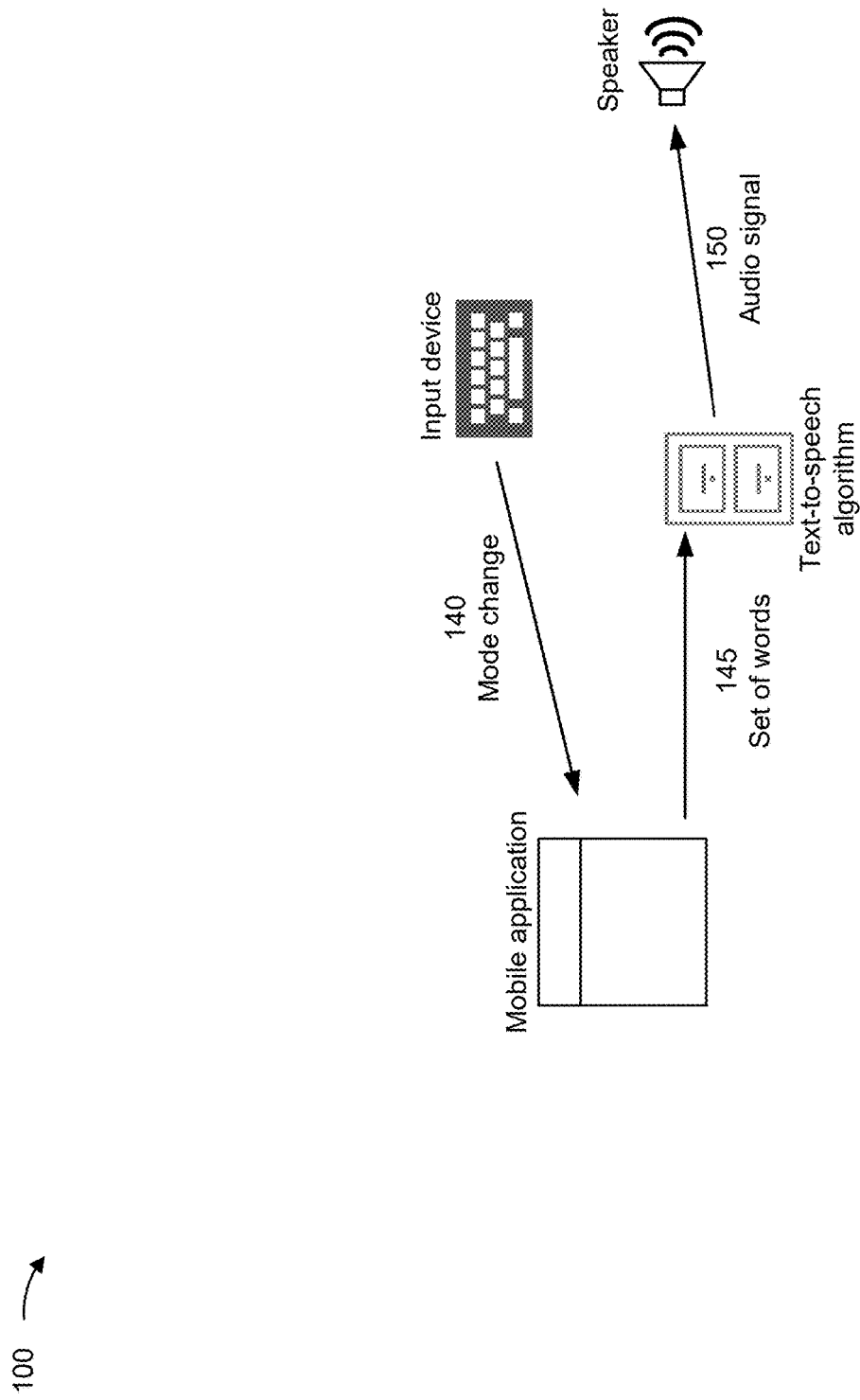

FIGS. 1A-1C are diagrams of an example 100 associated with flexible text-to-speech for screen readers. As shown in FIGS. 1A-1C, example 100 includes a mobile application (e.g., executed on a user device), an input device, a speaker, and a remote server. These devices are described in more detail in connection with FIGS. 3 and 4.

As shown in FIG. 1A and by reference number 105, the mobile application may receive (e.g., from the input device) a setting indicating a part of speech (e.g., at least one part of speech). For example, the user may select the part of speech from a plurality of possible parts of speech. Accordingly, the setting may include a data structure (e.g., an array, a class object, and/or another type of data structure) indicating the part of speech. In some implementations, the part of speech may be exclusionary. Accordingly, the mobile application may skip the selected part of speech, as described below in connection with reference number 130. Alternatively, the part of speech may be inclusionary. Accordingly, the mobile application may include the selected part of speech, as described below in connection with reference number 130.

In some implementations, the mobile application may receive the setting via a visual component (e.g., checkboxes, radio buttons, and/or another type of visual component). Alternatively, the mobile application may receive the setting via a voice command.

As shown by reference number 110, the mobile application may receive a set of words for conversion to speech. For example, as shown in FIG. 1A, the mobile application may transmit, and the remote server may receive, a request for content. Accordingly, the mobile application receives the set of words in response to the request. In some implementations, the mobile application may receive (e.g., from the input device) an indication of a webpage (e.g., an Internet protocol (IP) number, a uniform resource locator (URL), and/or another type of indication), such that the request is for content indexed to the webpage. For example, the request may include a hypertext transfer protocol (HTTP) request, a file transfer protocol (FTP) request, and/or another type of request for content. Additionally, the remote server may be associated with the webpage. For example, the mobile application may use a domain name service (DNS) and/or another third party to identify the remote server based on the indication of the webpage.

As shown by reference number 115, the mobile application may identify, within the set of words, a first subset of the set of words that correspond to the part of speech. For example, the mobile application may identify all nouns as the first subset, all verbs as the first subset, all helping verbs as the first subset, all prepositions as the first subset, all articles as the first subset, all exclamations as the first subset, all conjunctions as the first subset, and/or all gerunds as the first subset, among other examples. In some implementations, the mobile application may use natural language processing (NLP) to identify the first subset, of the set of words, that correspond to the part of speech. For example, the mobile application may receive (e.g., from the input device) an indication of a language associated with the user or may identify a language associated with the set of words using an n-gram model, a Markov model, a dictionary method (e.g., based on word relevance), and/or another type of model to guess the language. Accordingly, the mobile application may apply an NLP model selected based on the language.

Additionally, or alternatively, the mobile application may identify, within the set of words, a second subset of the set of words associated with a font size that fails to satisfy a size threshold. For example, the set of words may be associated with hypertext markup language (HTML) tags, rules indicated in cascading style sheets (CSS), and/or similar formatting information that indicates associated font sizes for subsets of the set of words. Accordingly, based on the associated font sizes, the mobile application may identify the second subset, of the set of words, associated with a font size that fails to satisfy the size threshold.

In some implementations, the mobile application may receive (e.g., from the input device) an indication of the size threshold. For example, the mobile application may receive a point size to use as the size threshold. Alternatively, the mobile application may receive an indicator of a relative size (e.g., "small," "very small," 10% of a largest font size associated with the set of words, one-half of an average font size associated with the set of words, 20% of a median font size associated with the set of words, one-third of a modal font size associated with the set of words, and/or another relative measure) such that the mobile application determines the size threshold (e.g., as described below). In some implementations, the mobile application may receive the indication of the size threshold via a visual component (e.g., radio buttons, a textbox, and/or another type of visual component). Alternatively, the mobile application may receive the indication of the size threshold via a voice command.

Additionally, or alternatively, the mobile application may determine the size threshold based on a plurality of font sizes associated with the set of words. For example, the mobile application may apply a machine learning model (e.g., similarly as described in connection with FIGS. 2A-2B) to determine the size threshold. The model may accept, as input, the plurality of font sizes and, optionally, may accept positions (e.g., closer to a top of the webpage or a bottom of the webpage) associated with the plurality of font sizes, in order to determine the size threshold. In another example, the mobile application may apply a relative size as described above.

Accordingly, as described below in connection with reference number 130, the mobile application may skip the first subset and the second subset while inputting remaining words of the set of words to a text-to-speech algorithm. Additionally, or alternatively, as shown in FIG. 1B and by reference number 120, the mobile application may apply a model to the set of words to determine relevance.

In some implementations, the model may use corresponding formatting properties, associated with different subsets of the set of words, to identify a relevant subset (e.g., one or more subsets identified as relevant). Similarly, the model may use the corresponding formatting properties to identify a non-relevant subset (e.g., one or more subsets identified as not relevant). For example, the corresponding formatting properties may include HTML tags (e.g., one or more HTML tags), rules indicated in CSS (e.g., one or more rules indicated in one or more CSS), and/or other similar formatting indicators. Accordingly, the model may select the relevant subset based on a sentence in the set of words including bold formatting, a sentence in the set of words including italics formatting, a bulleted and/or ordered list included in the set of words, a portion of the set of words being associated with a font size that satisfies a size threshold, and/or a sentence in the set of words following a paragraph tag and/or tab spacing (e.g., to identify introductory sentences), among other examples.

Additionally, or alternatively, the corresponding formatting properties may include positions (e.g., one or more positions) and/or pixel sizes (e.g., one or more pixel sizes) associated with the set of words. Accordingly, the model may select the relevant subset based on a sentence in the set of words being within a quantity of pixels and/or length of a top, of the webpage, that satisfies a distance threshold. In another example, the model may select the relevant subset based on a sentence in the set of words offset from adjacent content above and/or below by white space that satisfies the distance threshold (e.g., to identify introductory sentences).

Additionally, or alternatively, the mobile application may receive (e.g., from the input device) keywords (e.g., one or more keywords). In some implementations, the mobile application may receive the keywords via a visual component (e.g., textboxes and/or another type of visual component). Alternatively, the mobile application may receive the keywords via a voice command. Accordingly, the model may identify, within the set of words, the relevant subset based on distances (e.g., one or more distances) between the relevant subset and the keywords in the set of words. Similarly, the model may identify, within the set of words, the non-relevant subset based on distances (e.g., one or more distances) between the non-relevant subset and the keywords in the set of words.

Any of the factors described above may be combined. For example, the relevant subset may satisfy multiple conditions (e.g., a size threshold and/or a distance threshold) in order to be identified as relevant. In another example, a machine learning model as described in connection with FIGS. 2A-2B may combine formatting properties and distances associated with the keywords to identify the relevant subset.

As shown by reference number 125, the mobile application may receive, as output from the model, an indication of the non-relevant subset and the relevant subset. Accordingly, as shown by reference number 130, the mobile application may skip the non-relevant subset of the set of words while inputting the relevant subset of the set of words to the text-to-speech algorithm. In some implementations, the mobile application may additionally or alternatively skip the first subset corresponding to the part of speech and/or the second subset associated with the font size that fails to satisfy the size threshold, as described above, while inputting remaining words to the text-to-speech algorithm.

In some implementations, the text-to-speech algorithm is included in the mobile application (e.g., in an executable file, a linked library file, and/or another portion of stored code comprising the mobile application). Alternatively, the text-to-speech algorithm is included in separately stored code such that the mobile application inputs the relevant subset and/or the remaining words to an application programming interface (API) associated with the text-to-speech algorithm. For example, the text-to-speech algorithm and the API may be provided by an operating system (e.g., of the user device that is executing the mobile application).

Accordingly, as shown by reference number 135, the text-to-speech algorithm may generate an audio signal (e.g., for output to the speaker) based on the words input to the text-to-speech algorithm by the mobile application. For example, the text-to-speech algorithm may use concatenative synthesis, formant synthesis, and/or another technique to generate the audio signal based on the words. As a result, the user device conserves power and processing resources because fewer words, of the set of words, are input to the text-to-speech algorithm for processing into the audio signal.

In some implementations, the mobile application may skip some words in the set of words (e.g., as described above in connection with reference number 130) based on input (e.g., from the input device) associated with a skim mode. In some implementations, the mobile application may receive the input associated with the skim mode via a visual component (e.g., a button and/or another type of visual component). Alternatively, the mobile application may receive the input associated with the skim mode via a voice command.

As shown in FIG. 1C and by reference number 140, the mobile application may receive input (e.g., from the input device) associated with a full read mode. In some implementations, the mobile application may receive the input associated with the full reader mode via a visual component (e.g., a button and/or another type of visual component). Alternatively, the mobile application may receive the input associated with the full read mode via a voice command.

Accordingly, as shown by reference number 145, the mobile application may stop inputting some of the set of words (e.g., based on skipping the first subset, the second subset, and/or the non-relevant subset, as described above) and begin inputting all remaining words of the set of words. As a result, the user may dynamically switch from a power conserving mode (e.g., the skim mode) to the full read mode. Accordingly, as shown by reference number 150, the text-to-speech algorithm may generate an audio signal (e.g., for output to the speaker) based on all remaining words, of the set of words, input to the text-to-speech algorithm by the mobile application.

In some implementations, the user may additionally or alternatively switch to the skim mode from the full read mode. For example, the mobile application may receive input (e.g., from the input device) associated with the skim mode, as described above. Accordingly, the mobile application may stop inputting all remaining words of the set of words and begin inputting some remaining words of the set of words (e.g., based on skipping the first subset, the second subset, and/or the non-relevant subset, as described above). As a result, the user may dynamically switch from the full read mode to a power conserving mode (e.g., the skim mode).

Although described above using the full read mode and the skim mode, other implementations may include more than two modes. For example, the mobile application may have a heavy skim mode that skips two or more of the first subset, the second subset, and/or the non-relevant subset, as described above, and a light skim mode that skips only one of the first subset, the second subset, and/or the non-relevant subset. In another example, the heavy skim mode may be associated with skipping more parts of speech than the light skim mode. Additionally, or alternatively, the heavy skim mode may be associated with a model that tends to classify more words as non-relevant as compared with a model associated with the light skim mode. Additional modes may be implemented accordingly.

By using techniques as described in connection with FIGS. 1A-1C, the user device conserves processing resources and power by reducing a quantity of words, of the set of words, to be converted to audio by the text-to-speech algorithm.

As indicated above, FIGS. 1A-1C are provided as an example. Other examples may differ from what is described with regard to FIGS. 1A-1C.

Figure 2A:
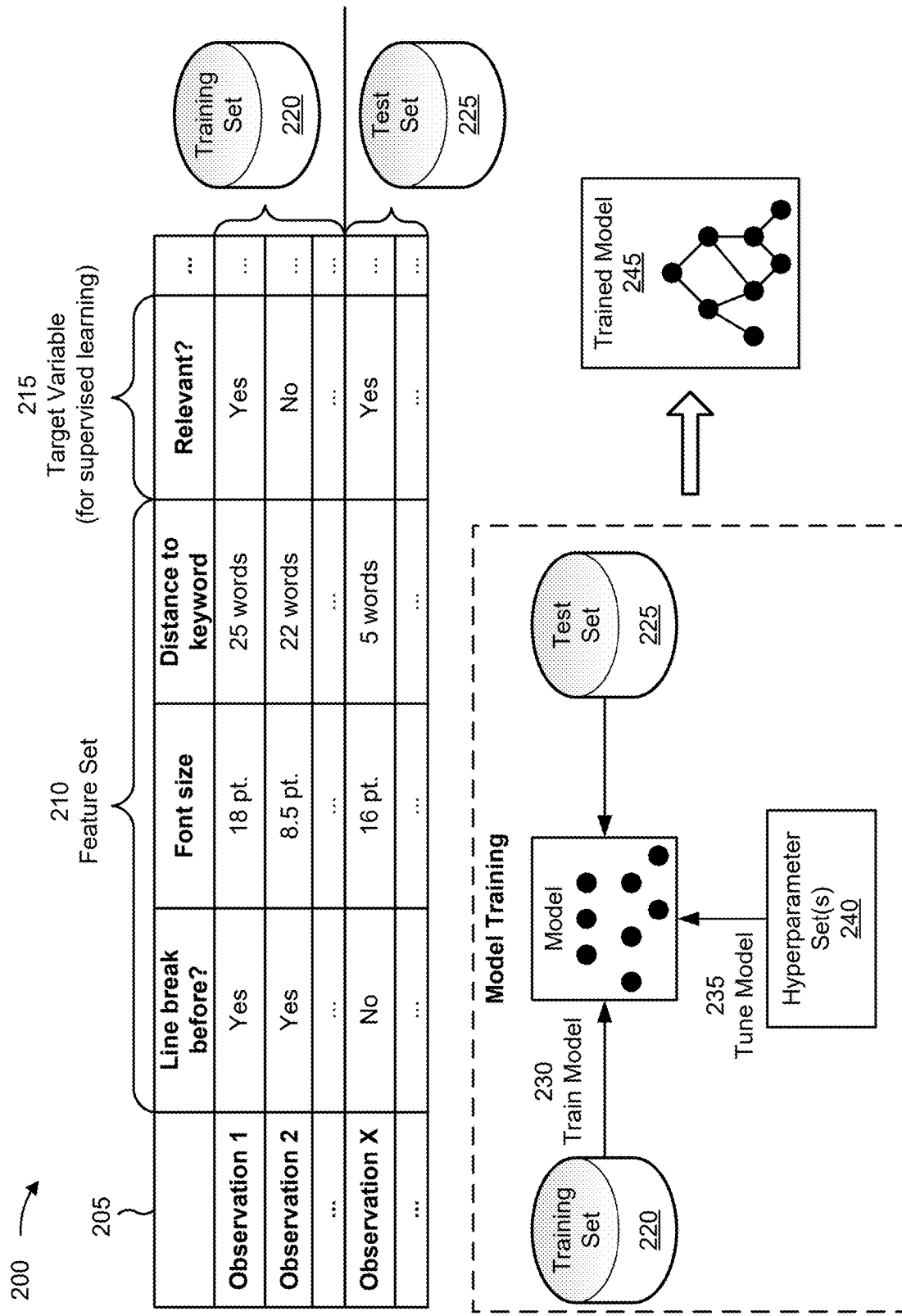
FIGS. 2A-2B are diagrams of an example of training and applying a machine learning model for systems and/or methods described herein.
Figure 2B:
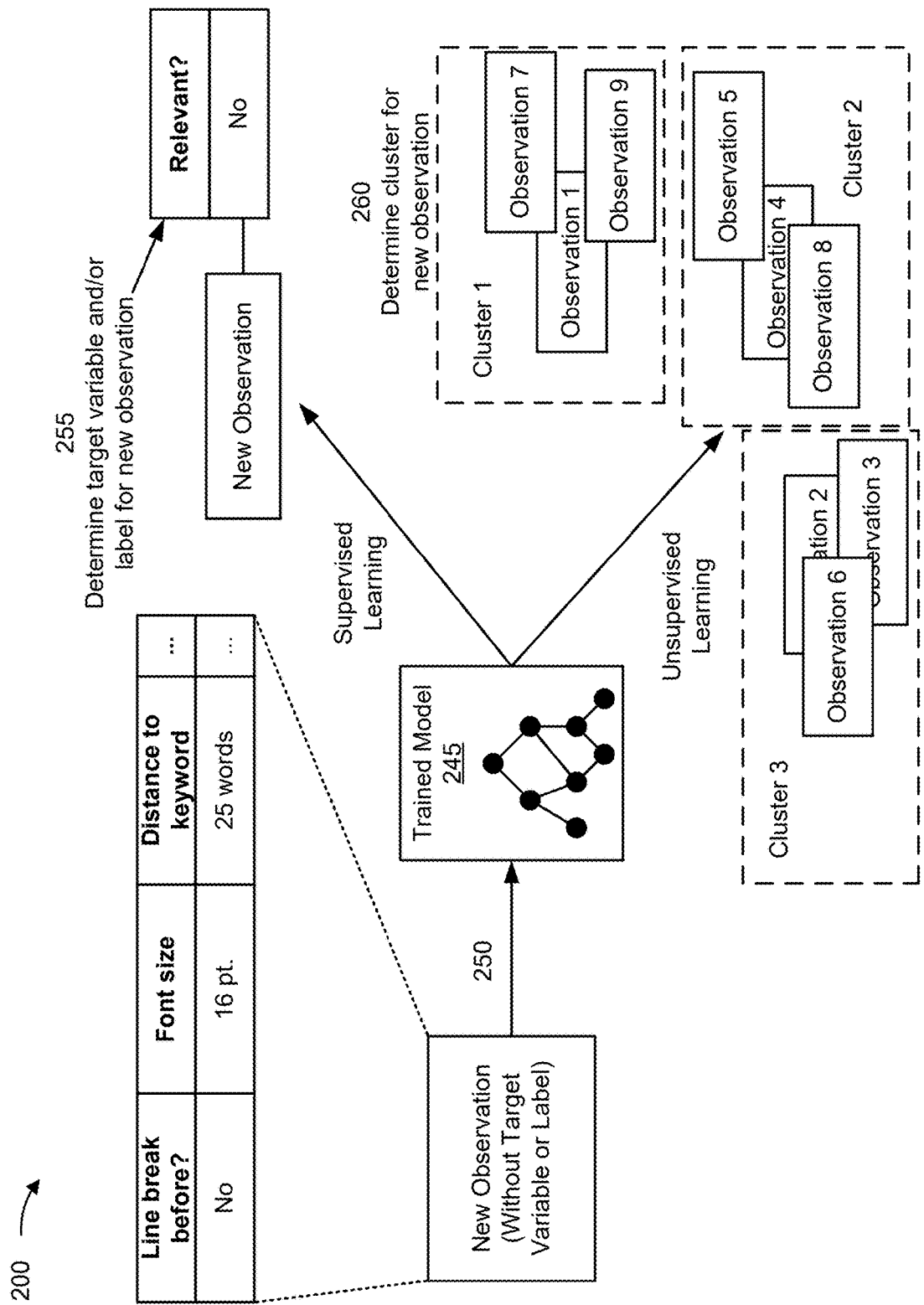

FIGS. 2A and 2B are a diagram illustrating an example 200 of training a machine learning model in connection with flexible text-to-speech for screen readers. The machine learning model training described herein may be performed using a machine learning system. The machine learning system may include or may be included in a computing device, a server, a cloud computing environment, or the like, such as a user device or a remote server, described in more detail below.

As shown by reference number 205, a machine learning model may be trained using a set of observations. The set of observations may be obtained and/or input from training data (e.g., historical data), such as data gathered during one or more processes described herein. For example, the set of observations may include data gathered from webpages, as described elsewhere herein. In some implementations, the machine learning system may receive the set of observations (e.g., as input) from a remote server (e.g., one or more remote servers).

As shown by reference number 210, a feature set may be derived from the set of observations. The feature set may include a set of variables. A variable may be referred to as a feature. A specific observation may include a set of variable values corresponding to the set of variables. A set of variable values may be specific to an observation. In some cases, different observations may be associated with different sets of variable values, sometimes referred to as feature values. In some implementations, the machine learning system may determine variables for a set of observations and/or variable values for a specific observation based on input received from a user device. For example, the machine learning system may identify a feature set (e.g., one or more features and/or corresponding feature values) from structured data input to the machine learning system, such as by extracting data from a particular column of a table, extracting data from a particular field of a form and/or a message, and/or extracting data received in a structured data format. Additionally, or alternatively, the machine learning system may receive input from an operator to determine features and/or feature values. In some implementations, the machine learning system may perform natural language processing and/or another feature identification technique to extract features (e.g., variables) and/or feature values (e.g., variable values) from text (e.g., unstructured data) input to the machine learning system, such as by identifying keywords and/or values associated with those keywords from the text.

As an example, a feature set for a set of observations may include a first feature of whether a subset of a set of words is associated with a preceding line break, a second feature of a font size associated with the subset, a third feature of a distance between the subset (e.g., an initial word of the subset, a final word of the subset, a midpoint word of the subset, and/or another word within the subset) and a keyword, and so on. As shown, for a first observation, the first feature may have a value of Yes, the second feature may have a value of 18 points, the third feature may have a value of 25 words, and so on. These features and feature values are provided as examples, and may differ in other examples. For example, the feature set may include one or more of the following features: whether the subset is associated with a preceding paragraph tag, whether the subset is associated with bold formatting, whether the subset is associated with italics formatting, whether the subset is associated with a bulleted and/or ordered list, whether the subset is associated with a different color than preceding and/or subsequent words, whether the subset is included in alternate text for an image and/or other multimedia, and/or a part of speech associated with the subset, among other examples. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources and/or memory resources) used to train the machine learning model.

As shown by reference number 215, the set of observations may be associated with a target variable. The target variable may represent a variable having a numeric value (e.g., an integer value or a floating point value), may represent a variable having a numeric value that falls within a range of values or has some discrete possible values, may represent a variable that is selectable from one of multiple options (e.g., one of multiples classes, classifications, or labels), or may represent a variable having a Boolean value (e.g., 0 or 1, True or False, Yes or No), among other examples. A target variable may be associated with a target variable value, and a target variable value may be specific to an observation. In some cases, different observations may be associated with different target variable values. In example 200, the target variable is relevance, which has a value of Yes for the first observation. Although depicted as binary, the target variable may instead be a score (e.g., a numerical score where a higher score indicates more relevance), a category (e.g., a letter grade and/or another relative indicator of relevance), and/or another variable associated with relevance. Accordingly, the variable may be converted to a binary observation based on a relevance threshold.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model or a predictive model. When the target variable is associated with continuous target variable values (e.g., a range of numbers), the machine learning model may employ a regression technique. When the target variable is associated with categorical target variable values (e.g., classes or labels), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, or an automated signal extraction model. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 220 that includes a first subset of observations, of the set of observations, and a test set 225 that includes a second subset of observations of the set of observations. The training set 220 may be used to train (e.g., fit or tune) the machine learning model, while the test set 225 may be used to evaluate a machine learning model that is trained using the training set 220. For example, for supervised learning, the test set 225 may be used for initial model training using the first subset of observations, and the test set 225 may be used to test whether the trained model accurately predicts target variables in the second subset of observations. In some implementations, the machine learning system may partition the set of observations into the training set 220 and the test set 225 by including a first portion or a first percentage of the set of observations in the training set 220 (e.g., 75%, 80%, or 85%, among other examples) and including a second portion or a second percentage of the set of observations in the test set 225 (e.g., 25%, 20%, or 15%, among other examples). In some implementations, the machine learning system may randomly select observations to be included in the training set 220 and/or the test set 225.

As shown by reference number 230, the machine learning system may train a machine learning model using the training set 220. This training may include executing, by the machine learning system, a machine learning algorithm to determine a set of model parameters based on the training set 220. In some implementations, the machine learning algorithm may include a regression algorithm (e.g., linear regression or logistic regression), which may include a regularized regression algorithm (e.g., Lasso regression, Ridge regression, or Elastic-Net regression). Additionally, or alternatively, the machine learning algorithm may include a decision tree algorithm, which may include a tree ensemble algorithm (e.g., generated using bagging and/or boosting), a random forest algorithm, or a boosted trees algorithm. A model parameter may include an attribute of a machine learning model that is learned from data input into the model (e.g., the training set 220). For example, for a regression algorithm, a model parameter may include a regression coefficient (e.g., a weight). For a decision tree algorithm, a model parameter may include a decision tree split location, as an example.

As shown by reference number 235, the machine learning system may use one or more hyperparameter sets 240 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the machine learning model to the training set 220. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), and/or may be applied by setting one or more feature values to zero (e.g., for automatic feature selection). Example hyperparameters for a decision tree algorithm include a tree ensemble technique to be applied (e.g., bagging, boosting, a random forest algorithm, and/or a boosted trees algorithm), a number of features to evaluate, a number of observations to use, a maximum depth of each decision tree (e.g., a number of branches permitted for the decision tree), or a number of decision trees to include in a random forest algorithm.

To train a machine learning model, the machine learning system may identify a set of machine learning algorithms to be trained (e.g., based on operator input that identifies the one or more machine learning algorithms and/or based on random selection of a set of machine learning algorithms), and may train the set of machine learning algorithms (e.g., independently for each machine learning algorithm in the set) using the training set 220. The machine learning system may tune each machine learning algorithm using one or more hyperparameter sets 240 (e.g., based on operator input that identifies hyperparameter sets 240 to be used and/or based on randomly generating hyperparameter values). The machine learning system may train a particular machine learning model using a specific machine learning algorithm and a corresponding hyperparameter set 240. In some implementations, the machine learning system may train multiple machine learning models to generate a set of model parameters for each machine learning model, where each machine learning model corresponds to a different combination of a machine learning algorithm and a hyperparameter set 240 for that machine learning algorithm.

In some implementations, the machine learning system may perform cross-validation when training a machine learning model. Cross validation can be used to obtain a reliable estimate of machine learning model performance using only the training set 220, and without using the test set 225, such as by splitting the training set 220 into a number of groups (e.g., based on operator input that identifies the number of groups and/or based on randomly selecting a number of groups) and using those groups to estimate model performance. For example, using k-fold cross-validation, observations in the training set 220 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k−1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, or a standard error across cross-validation scores.

In some implementations, the machine learning system may perform cross-validation when training a machine learning model by splitting the training set into a number of groups (e.g., based on operator input that identifies the number of groups and/or based on randomly selecting a number of groups). The machine learning system may perform multiple training procedures and may generate a cross-validation score for each training procedure. The machine learning system may generate an overall cross-validation score for each hyperparameter set 240 associated with a particular machine learning algorithm. The machine learning system may compare the overall cross-validation scores for different hyperparameter sets 240 associated with the particular machine learning algorithm, and may select the hyperparameter set 240 with the best (e.g., highest accuracy, lowest error, or closest to a desired threshold) overall cross-validation score for training the machine learning model. The machine learning system may then train the machine learning model using the selected hyperparameter set 240, without cross-validation (e.g., using all of data in the training set 220 without any hold-out groups), to generate a single machine learning model for a particular machine learning algorithm. The machine learning system may then test this machine learning model using the test set 225 to generate a performance score, such as a mean squared error (e.g., for regression), a mean absolute error (e.g., for regression), or an area under receiver operating characteristic curve (e.g., for classification). If the machine learning model performs adequately (e.g., with a performance score that satisfies a threshold), then the machine learning system may store that machine learning model as a trained machine learning model 245 to be used to analyze new observations, as described below in connection with FIG. 3.

In some implementations, the machine learning system may perform cross-validation, as described above, for multiple machine learning algorithms (e.g., independently), such as a regularized regression algorithm, different types of regularized regression algorithms, a decision tree algorithm, or different types of decision tree algorithms. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 220 (e.g., without cross-validation), and may test each machine learning model using the test set 225 to generate a corresponding performance score for each machine learning model. The machine learning model may compare the performance scores for each machine learning model, and may select the machine learning model with the best (e.g., highest accuracy, lowest error, or closest to a desired threshold) performance score as the trained machine learning model 245.

FIG. 2B illustrates applying a trained machine learning model to a new observation associated with flexible text-to-speech for screen readers. The new observation may be input to a machine learning system that stores the trained machine learning model 245. The machine learning system may include or may be included in a computing device, a server, or a cloud computing environment, such as a user device and/or a remote server.

As shown by reference number 250, the machine learning system may receive a new observation (or a set of new observations), and may input the new observation to the machine learning model 245. As shown, the new observation (e.g., a new subset of the set of words) may include a first feature of no line break preceding the new subset of the set of words, a second feature of 16 points, a third feature of 25 words, and so on, as an example. The machine learning system may apply the trained machine learning model 245 to the new observation to generate an output (e.g., a result). The type of output may depend on the type of machine learning model and/or the type of machine learning task being performed. For example, the output may include a predicted (e.g., estimated) value of target variable (e.g., a value within a continuous range of values, a discrete value, a label, a class, or a classification), such as when supervised learning is employed. Additionally, or alternatively, the output may include information that identifies a cluster to which the new observation belongs and/or information that indicates a degree of similarity between the new observation and one or more prior observations (e.g., which may have previously been new observations input to the machine learning model and/or observations used to train the machine learning model), such as when unsupervised learning is employed.

In some implementations, the trained machine learning model 245 may predict a value of No for the target variable of relevance for the new observation, as shown by reference number 255. Based on this prediction (e.g., based on the value having a particular label or classification or based on the value satisfying or failing to satisfy a threshold), the machine learning system may provide a recommendation and/or output for determination of a recommendation, such as skipping the subset when applying a text-to-speech algorithm. Additionally, or alternatively, the machine learning system may perform an automated action and/or may cause an automated action to be performed (e.g., by instructing another device to perform the automated action), such as removing the subset from a string that is returned for conversion to speech. As another example, if the machine learning system were to predict a value of Yes for the target variable of relevance, then the machine learning system may provide a different recommendation (e.g., including the subset when applying a text-to-speech algorithm) and/or may perform or cause performance of a different automated action (e.g., retaining the subset in a string that is returned for conversion to speech). In some implementations, the recommendation and/or the automated action may be based on the target variable value having a particular label (e.g., classification or categorization) and/or may be based on whether the target variable value satisfies one or more threshold (e.g., whether the target variable value is greater than a threshold, is less than a threshold, is equal to a threshold, or falls within a range of threshold values).

In some implementations, the trained machine learning model 245 may classify (e.g., cluster) the new observation in a cluster, as shown by reference number 260. The observations within a cluster may have a threshold degree of similarity. As an example, if the machine learning system classifies the new observation in a first cluster (e.g., relevant), then the machine learning system may provide a first recommendation, such as including the subset when applying a text-to-speech algorithm. Additionally, or alternatively, the machine learning system may perform a first automated action and/or may cause a first automated action to be performed (e.g., by instructing another device to perform the automated action) based on classifying the new observation in the first cluster, such as retaining the subset in a string that is returned for conversion to speech. As another example, if the machine learning system were to classify the new observation in a second cluster (e.g., non-relevant), then the machine learning system may provide a second (e.g., different) recommendation (e.g., skipping the subset when applying a text-to-speech algorithm) and/or may perform or cause performance of a second (e.g., different) automated action, such as removing the subset from a string that is returned for conversion to speech.

The recommendations, actions, and clusters described above are provided as examples, and other examples may differ from what is described above. For example, the recommendations associated with moderate relevance (e.g., between relevant and non-relevant) may include skipping the subset when applying a text-to-speech algorithm based on a mode being applied (e.g., a heavy skim mode as compared with a light skim mode). The actions associated with moderate relevance may include, for example, returning the subset in a separate string for processing based on the mode being applied.

In this way, the machine learning system may apply a rigorous and automated process to reducing a quantity of words, in a set of words, for output via the text-to-speech algorithm. The machine learning system enables recognition and/or identification of tens, hundreds, thousands, or millions of features and/or feature values for tens, hundreds, thousands, or millions of observations, thereby increasing accuracy and consistency and reducing delay associated with selecting relevant words from the set of words in order to conserve power and processing resources that would otherwise be consumed by outputting the whole set of words to the text-to-speech algorithm.

As indicated above, FIGS. 2A and 2B are provided as an example. Other examples may differ from what is described in connection with FIGS. 2A and 2B. For example, the machine learning model may be trained using a different process than what is described in connection with FIGS. 2A and 2B. Additionally, or alternatively, the machine learning model may employ a different machine learning algorithm than what is described in connection with FIGS. 2A and 2B, such as a Bayesian estimation algorithm, a k-nearest neighbor algorithm, an a priori algorithm, a k-means algorithm, a support vector machine algorithm, a neural network algorithm (e.g., a convolutional neural network algorithm), and/or a deep learning algorithm.

Figure 3:
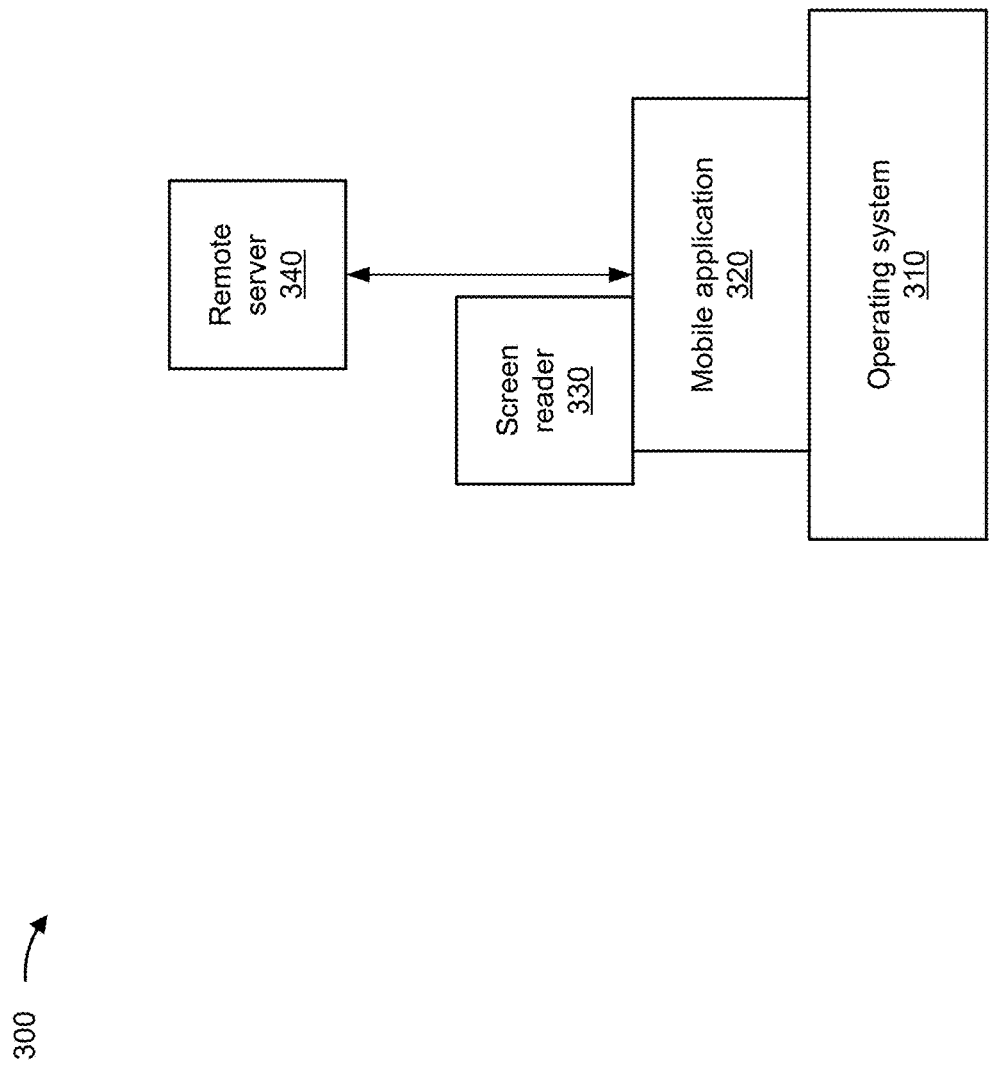
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include an operating system 310, a mobile application 320 (e.g., supported by the operating system 310), and a screen reader 330 (e.g., provided the operating system 310 or separately therefrom and used by the mobile application 320), as described in more detail below. The operating system 310, the mobile application 320, and the screen reader 330 may be executed on a user device. The user device may include a communication device. For example, the user device may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. The user device may include a speaker to transmit audio to a user. The user device may further include an input device to facilitate interaction with a user. Example input devices include a microphone, a keyboard, a touchscreen, and/or a mouse. Additionally, as further shown in FIG. 3, environment 300 may include a remote server 340. Devices and/or elements of environment 300 may interconnect via wired connections and/or wireless connections.

Figure 4:
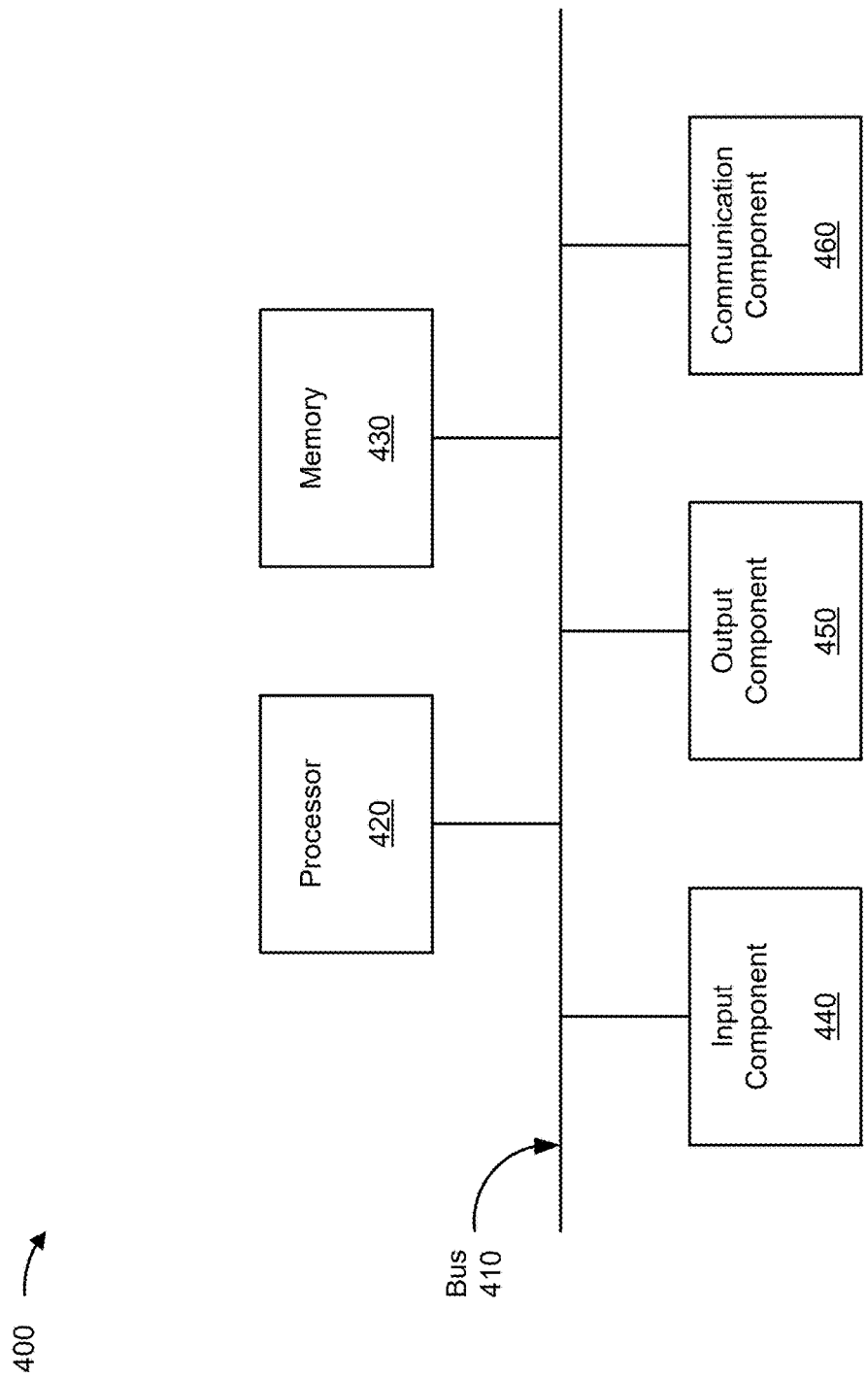
FIG. 4 is a diagram of example components of one or more devices of FIG. 3.

The operating system 310 may include system software capable of managing hardware of the user device (which may include, for example, one or more components of device 400 of FIG. 4) and providing an environment for execution of higher-level software, such as the mobile application 320. For example, the operating system 310 may include a kernel (e.g., a Windows-based kernel, a Linux kernel, a Unix-based kernel, such as an Android kernel, an iOS kernel, and/or another type of kernel) managing the hardware and library functions that may be used by the higher-level software. The operating system 310 may additionally provide a graphical user interface (GUI) and process input from a user. In some implementations, the operating system 310 may additionally provide a text-to-speech algorithm and an API for accessing the text-to-speech algorithm.

The mobile application 320 may include an executable capable of running on a user device using the operating system 310. In some implementations, the mobile application 320 may communicate with the remote server 340. For example, the mobile application 320 may use HTTP, FTP, and/or other Internet- or network-based protocols to request information from, transmit information to, and receive information from the remote server 340. Additionally, the mobile application 320 may input some words, selected from a set of words, to the screen reader 330 for conversion to audio, as described elsewhere herein.

The screen reader 330 may include a plug-in or another type of software that executes on top of the mobile application 320. In some implementations, the screen reader 330 may be at least partially integrated into the mobile application 320. Additionally, or alternatively, the screen reader 330 may at least partially operate independently of the mobile application 320. For example, the screen reader 330 may include a standalone text-to-speech algorithm or may be at least partially integrated with the operating system 310.

The remote server 340 may include remote computing devices that provide information to requesting devices over the Internet and/or another network (e.g., a cellular network, a public land mobile network (PLMN), a local area network (LAN), a wide area network (WAN), a private network, the Internet, and/or a combination of these or other types of networks). The remote server 340 may include a standalone server, one or more servers included on a server farm, or one or more servers spread across a plurality of server farms. In some implementations, the remote server 340 may include a cloud computing system. As an alternative, the remote server 340 may include one or more devices, such as device 400 of FIG. 4, that may include a standalone server or another type of computing device.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

FIG. 4 is a diagram of example components of a device 400, which may correspond to a user device and/or a remote server. In some implementations, a user device and/or a remote server include one or more devices 400 and/or one or more components of device 400. As shown in FIG. 4, device 400 may include a bus 410, a processor 420, a memory 430, an input component 440, an output component 450, and a communication component 460.

Bus 410 includes one or more components that enable wired and/or wireless communication among the components of device 400. Bus 410 may couple together two or more components of FIG. 4, such as via operative coupling, communicative coupling, electronic coupling, and/or electric coupling. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform one or more operations or processes described elsewhere herein.

Memory 430 includes volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 includes one or more memories that are coupled to one or more processors (e.g., processor 420), such as via bus 410.

Input component 440 enables device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry is used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
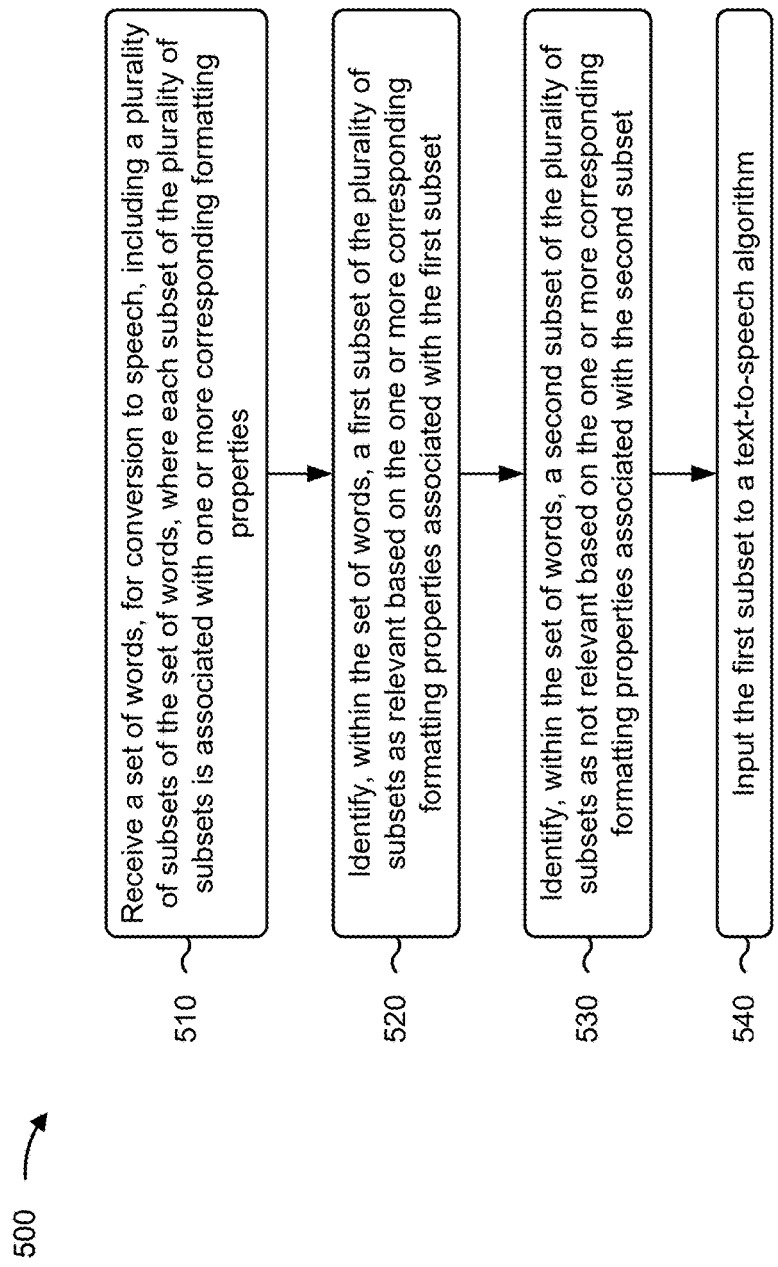
FIGS. 5 and 6 are flowchart of example processes relating to flexible text-to-speech for screen readers.

FIG. 5 is a flowchart of an example process 500 associated with flexible text-to-speech for screen readers. In some implementations, one or more process blocks of FIG. 5 may be performed by a device (e.g., a user device executing operating system 310 and mobile application 320). In some implementations, one or more process blocks of FIG. 5 may be performed by another device or a group of devices separate from or including the device, such as remote server 340. Additionally, or alternatively, one or more process blocks of FIG. 5 may be performed by one or more components of device 400, such as processor 420, memory 430, input component 440, output component 450, and/or communication component 460.

As shown in FIG. 5, process 500 may include receiving a set of words, for conversion to speech, including a plurality of subsets of the set of words, where each subset of the plurality of subsets is associated with one or more corresponding formatting properties (block 510). For example, the corresponding formatting properties may include HTML tags (e.g., one or more HTML tags), rules indicated in CSS (e.g., one or more rules indicated in one or more CSS), and/or other similar formatting indicators. Additionally, or alternatively, the corresponding formatting properties may include positions (e.g., one or more positions) and/or pixel sizes (e.g., one or more pixel sizes) associated with the set of words.

As further shown in FIG. 5, process 500 may include identifying, within the set of words, a first subset of the plurality of subsets as relevant based on the one or more corresponding formatting properties associated with the first subset (block 520). For example, the first subset may be identified based on a sentence in the set of words including bold formatting, a sentence in the set of words including italics formatting, a bulleted and/or ordered list included in the set of words, a portion of the set of words being associated with a font size that satisfies a size threshold, and/or a sentence in the set of words following a paragraph tag and/or tab spacing (e.g., to identify introductory sentences), among other examples. Additionally, or alternatively, the first subset may be identified based on a sentence in the set of words being within a quantity of pixels and/or length of a top, of the webpage, that satisfies a distance threshold and/or based on a sentence in the set of words offset from adjacent content above and/or below by white space that satisfies the distance threshold (e.g., to identify introductory sentences), among other examples.

As further shown in FIG. 5, process 500 may include identifying, within the set of words, a second subset of the plurality of subsets as not relevant based on the one or more corresponding formatting properties associated with the second subset (block 530). For example, the second subset may be identified as remaining words within the set of words that are not included in the first subset. Additionally, or alternatively, the second subset may be identified using one or more of the factors described in connection with identifying the first subset.

Accordingly, as further shown in FIG. 5, process 500 may include inputting the first subset to a text-to-speech algorithm (block 540). Accordingly, the text-to-speech algorithm may generate an audio signal (e.g., for output to a speaker) based on the words input to the text-to-speech algorithm. For example, the text-to-speech algorithm may use concatenative synthesis, formant synthesis, and/or another technique to generate the audio signal based on the words.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1C and/or 2A-2B.

Figure 6:
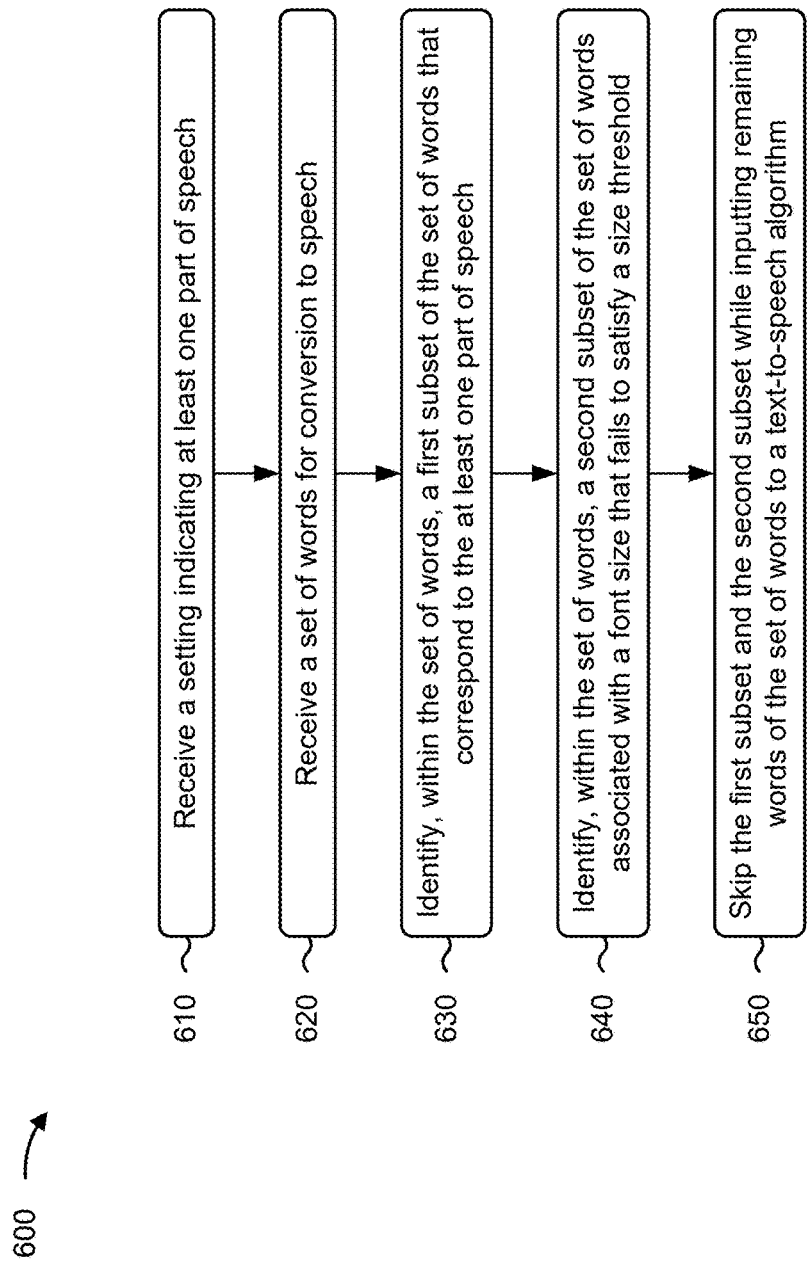

FIG. 6 is a flowchart of an example process 600 associated with flexible text-to-speech for screen readers. In some implementations, one or more process blocks of FIG. 6 may be performed by a device (a user device executing operating system 310 and mobile application 320). In some implementations, one or more process blocks of FIG. 6 may be performed by another device or a group of devices separate from or including the device, such as remote server 340. Additionally, or alternatively, one or more process blocks of FIG. 6 may be performed by one or more components of device 400, such as processor 420, memory 430, input component 440, output component 450, and/or communication component 460.

As shown in FIG. 6, process 600 may include receiving a setting indicating at least one part of speech (block 610). For example, a user may select the part of speech from a plurality of possible parts of speech. Accordingly, the setting may include a data structure (e.g., an array, a class object, and/or another type of data structure) indicating the part of speech.

As further shown in FIG. 6, process 600 may include receiving a set of words for conversion to speech (block 620). For example, a request for content may be transmitted to a remote server such that the set of words are received in response to the request.

As further shown in FIG. 6, process 600 may include identifying, within the set of words, a first subset of the set of words that correspond to the at least one part of speech (block 630). In some implementations, the first subset may be identified using NLP. For example, an indication of a language associated with the set of words may be received or the language may be identified using an n-gram model, a Markov model, a dictionary method (e.g., based on word relevance), and/or another type of model to guess the language. Accordingly, an NLP model may be used based on the language.

Additionally, as further shown in FIG. 6, process 600 may include identifying, within the set of words, a second subset of the set of words associated with a font size that fails to satisfy a size threshold (block 640). For example, the set of words may be associated with HTML tags, rules indicated in CSS, and/or similar formatting information that indicates associated font sizes for subsets of the set of words.

Accordingly, as further shown in FIG. 6, process 600 may include skipping the first subset and the second subset while inputting remaining words of the set of words to a text-to-speech algorithm (block 650). Accordingly, the text-to-speech algorithm may generate an audio signal (e.g., for output to a speaker) based on the words input to the text-to-speech algorithm. For example, the text-to-speech algorithm may use concatenative synthesis, formant synthesis, and/or another technique to generate the audio signal based on the words.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel. The process 600 is an example of one process that may be performed by one or more devices described herein. These one or more devices may perform one or more other processes based on operations described herein, such as the operations described in connection with FIGS. 1A-1C and/or 2A-2B. As described here, process 600 and process 500 may be combined.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code-it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for flexible text-to-speech for screen readers, the system comprising:
one or more memories; and
one or more processors, communicatively coupled to the one or more memories, configured to:
receive, by a mobile application executed on a device, an input associated with a mode of the device,
wherein the mode is associated with at least one of:
a skim mode related to a power conserving mode,
a heavy skim mode related to the power conserving mode,
a light skim mode related to the power conserving mode, or
a full read mode;
receive, by the mobile application, a setting indicating at least one part of speech;
receive, by the mobile application and from a remote server, a set of words for conversion to speech;
identify, by the mobile application and within the set of words, a first subset of the set of words that correspond to the at least one part of speech;
identify, by the mobile application, and within the set of words, a second subset of the set of words,
wherein the device identifies the second subset based on analyzing computer code associated with formatting indicators associated with the set of words,
wherein the second subset is associated with a computer code formatting indicator related to a font size that fails to satisfy a size threshold, and
wherein the second subset is further identified based on a threshold distance of the second subset from one or more keywords;
skip, by the mobile application and based on the input associated with the mode, the first subset and the second subset while inputting, by the mobile application, remaining words of the set of words to a text-to-speech algorithm comprising of code that is accessible by the mobile application; and generate, by the device, an audio signal based on the inputted remaining words and based on using the text-to-speech algorithm,
wherein the device conserves power and processing resources based on generating the audio signal that is based on the inputted remaining words; and
output, by a speaker device associated with the device, the audio signal.

2. The system of claim 1, wherein the one or more processors are further configured to: receive an indication of a webpage; and transmit, to the remote server associated with the webpage, a request for content indexed to the webpage, wherein the set of words is received from the remote server in response to the request.

3. The system of claim 1, wherein the one or more processors, to receive the setting indicating the at least one part of speech, are configured to:
receive a voice command indicating the at least one part of speech.

4. The system of claim 1, wherein the one or more processors, to identify the first subset, are configured to:
use natural language processing (NLP) to identify the first subset of the set of words that correspond to the at least one part of speech.

5. The system of claim 1, wherein the one or more processors are further configured to:
determine the size threshold based on a plurality of font sizes associated with the set of words.

6. The system of claim 1, wherein the one or more processors, to skip the first subset and the second subset while inputting remaining words of the set of words to the text-to-speech algorithm, are configured to:
input the remaining words to an application programming interface (API) associated with the text-to-speech algorithm and provided by an operating system.

7. The system of claim 1, wherein the one or more processors are further configured to:
receive another input associated with the full read mode related to the device;
stop inputting the remaining words; and
input remaining subsets of the set of words that include the first subset and the second subset.

8. A method of flexible text-to-speech for screen readers, comprising:
receiving, by a mobile application executed on a device, an input associated with a mode associated with the device,
wherein the mode is associated with at least one of:
a skim mode related to a power conserving mode,
a heavy skim mode related to the power conserving mode,
a light skim mode related to the power conserving mode, or
a full read mode;
receiving, by the mobile application, a set of words, for conversion to speech, including a plurality of subsets of the set of words, where each subset of the plurality of subsets is associated with one or more corresponding formatting properties;
identifying, by the mobile application and within the set of words, a first subset of the plurality of subsets as relevant based on the one or more corresponding formatting properties associated with the first subset and based on a threshold distance of the first subset from one or more keywords;
identifying, by the mobile application and within the set of words, a second subset of the plurality of subsets as not relevant based on analyzing computer code associated with the one or more corresponding formatting properties associated with the second subset and based on the threshold distance of the second subset from one or more keywords;
inputting, by the mobile application and based on the input associated with the mode, the first subset to a text-to-speech algorithm comprising of code that is accessible by the mobile application; and
generating, and outputting, by the device, an audio signal based on the inputted first subset,
wherein the device conserves power and processing resources based on generating the audio signal that is based on the inputted first subset.

9. The method of claim 8, wherein the one or more corresponding formatting properties comprise one or more hypertext markup language (HTML) tags, one or more rules indicated in one or more cascading style sheets (CSS), or a combination thereof.

10. The method of claim 8, wherein identifying the first subset as relevant comprises:
identifying one or more introductory sentences in the set of words,
wherein the first subset includes the one or more introductory sentences.

11. The method of claim 8, further comprising:
receiving one or more keywords in the set of words;
identifying, within the set of words, a third subset of the plurality of subsets as relevant based on one or more distances between the third subset and the one or more keywords in the set of words; and
inputting the third subset to the text-to-speech algorithm.

12. The method of claim 11, wherein the second subset is further identified as not relevant based on one or more distances between the second subset and the one or more keywords in the set of words.

13. The method of claim 8, wherein the one or more corresponding formatting properties comprise one or more positions, one or more pixel sizes, or a combination thereof.

14. The method of claim 8, further comprising:
transmitting, to a remote server, a request for content,
wherein the set of words are received from the remote server in response to the request.

15. A non-transitory computer-readable medium storing a set of instructions for flexible text-to-speech for screen readers, the set of instructions comprising:
one or more instructions that, when executed by one or more processors of a device, cause the device to:
receive, by a mobile application executed on the device, first input associated with a skim mode associated with a power conserving mode,
wherein the skim mode is further associated with at least one of a heavy skim mode related to the power conserving mode or a light skim mode related to the power conserving mode;
receive, by the mobile application, a set of words for conversion to speech;
identify, by the mobile application and within the set of words, a first subset of the set of words as relevant based on a machine learning model,
wherein the machine learning model identifies the first subset based on one or more formatting properties of the first subset and based on a first distance of the first subset from one or more keywords;

identify, by the mobile application and within the set of words, a second subset of the set of words as not relevant based on the machine learning model,
  wherein the machine learning model identifies the second subset based on analyzing computer code associated with one or more formatting properties of the second subset and based on a second distance of the second subset from one or more keywords;
input, by the mobile application, the first subset to a text-to-speech algorithm based on the first input,
  wherein the text-to-speech algorithm comprises code that is accessible by the mobile application; and
generate and output an audio signal based on the inputted first subset,
  wherein the device conserves power and processing resources based on generating the audio signal that is based on the inputted first subset.

16. The non-transitory computer-readable medium of claim 15, wherein the one or more instructions, when executed by the one or more processors, further cause the device to:
receive one or more keywords,
  wherein the machine learning model identifies relevant words based on the one or more keywords.

17. The non-transitory computer-readable medium of claim 15, wherein the machine learning model identifies relevant words based on formatting properties associated with the set of words.

18. The non-transitory computer-readable medium of claim 15, wherein the first input comprises voice commands.

19. The non-transitory computer-readable medium of claim 15, wherein the one or more instructions, when executed by the one or more processors, further cause the device to:
receive third input associated with the skim mode; and
stop inputting remaining words of the second subset and input remaining words of the first subset based on the third input.

20. The non-transitory computer-readable medium of claim 15, wherein the one or more instructions, that cause the device to receive the set of words for conversion to speech, cause the device to:
transmit, to a remote server, a request for content,
  wherein the set of words are received from the remote server in response to the request.

* * * * *